United States Patent

[11] 3,585,969

| [72] | Inventors | Edward J. Crane<br>Ottumwa;<br>Ralph F. Koch, Inwood; Edvin O.<br>Neimeyer, Rock Valley, all of, Iowa |
|---|---|---|
| [21] | Appl. No. | 833,437 |
| [22] | Filed | June 16, 1969 |
| [45] | Patented | June 22, 1971 |
| [73] | Assignee | U. S. Industries, Inc.<br>New York, N.Y. |

[54] DEMAND LIQUID FEED STATION
21 Claims, 15 Drawing Figs.

[52] U.S. Cl. ..................................................... 119/51.5
[51] Int. Cl. ..................................................... A01k 05/00,
A01k 05/02
[50] Field of Search............................................ 119/51.5,
51, 52, 51.11

[56] References Cited
UNITED STATES PATENTS

| 911,674 | 2/1909 | Olsen | 119/51.5 |
|---|---|---|---|
| 2,782,760 | 2/1957 | Wolfe | 119/51.5 |
| 2,961,126 | 9/1958 | Craig | 119/52 X |
| 3,225,742 | 12/1965 | Hagans | 119/51.11 |
| 3,265,036 | 8/1966 | Kloss | 119/51 |
| 3,339,529 | 9/1967 | Holste et al. | 119/51.5 |

Primary Examiner—Hugh R. Chamblee
Attorney—Price, Heneveld, Huizenga & Cooper

ABSTRACT: A demand-feeding apparatus for automatically supplying dry feed and a liquid to a trough, the feed being supplied by an auger in a channel having holes therein above the trough, the openings of the holes being adjustably controlled. A tank supplies the liquid from an inlet to which it is connected by emptying substantially all of its liquid contents when a float in the trough drops so as to actuate a limit switch. A float in the tank drops as the tank empties, thereby activating the motor driving the auger. The inlet of liquid to the tank is controlled by a float such as in a flush tank. The length of time the auger operates is controlled by partitioning the inlet of the tank from the outlet, and by including in the partition a metering slot the size of which can be altered. An alternate form of the control of the auger is by a timer, eliminating the need for the auger control float and the partition.

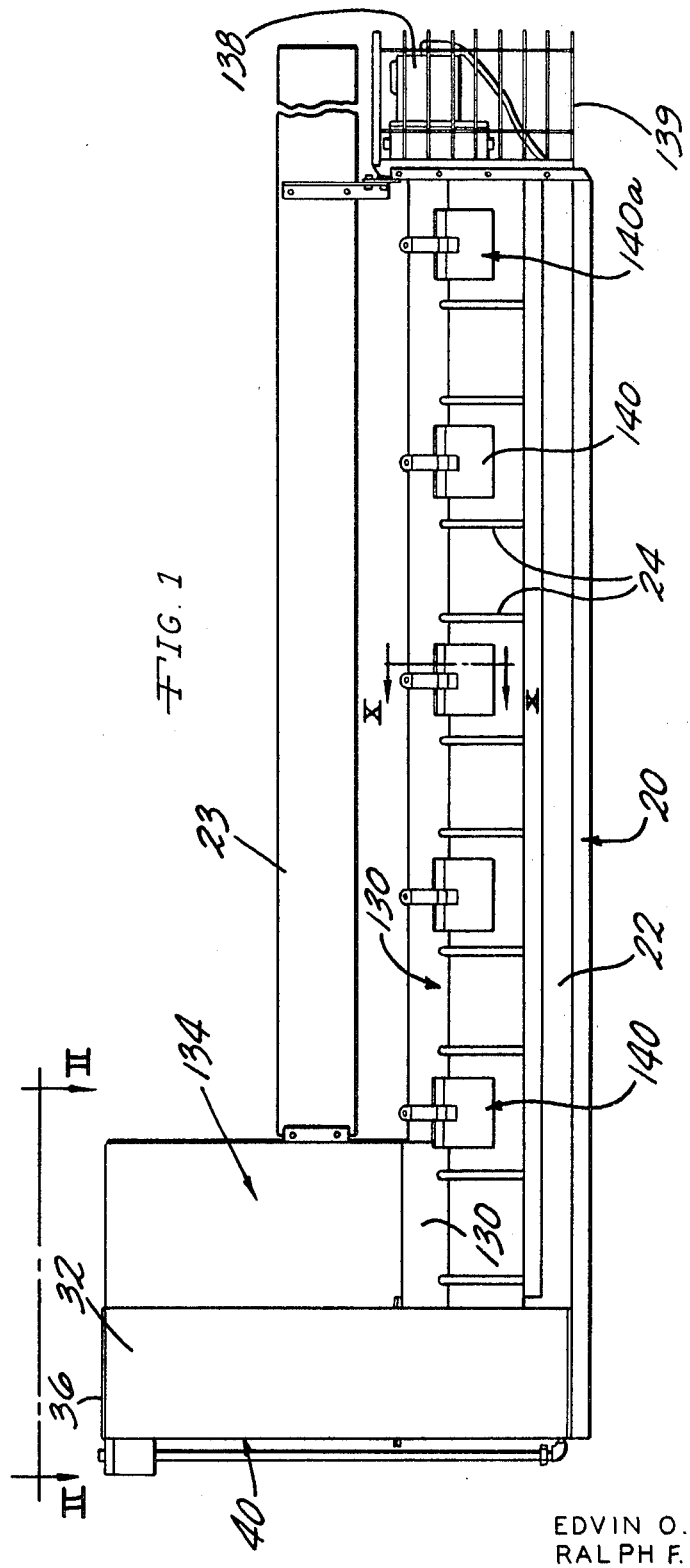

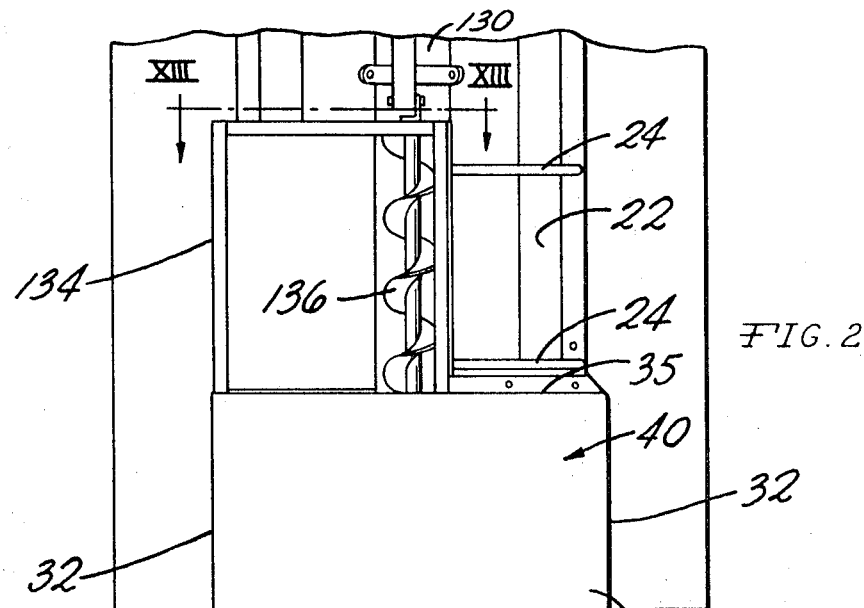
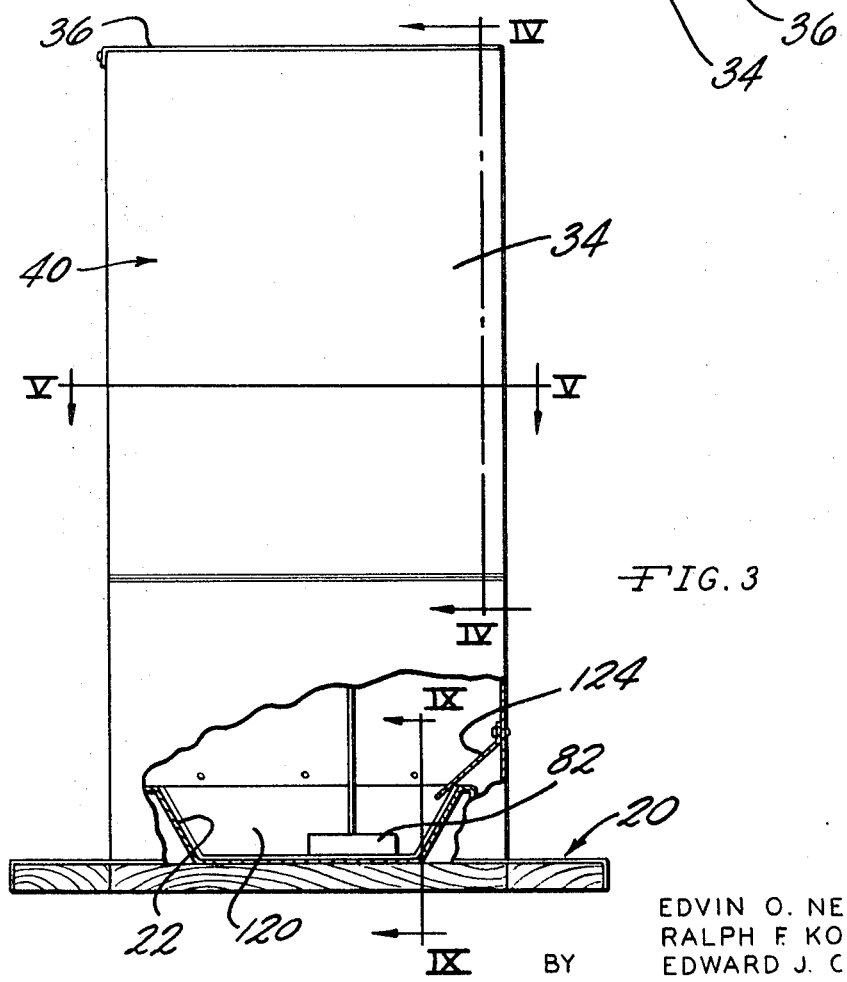

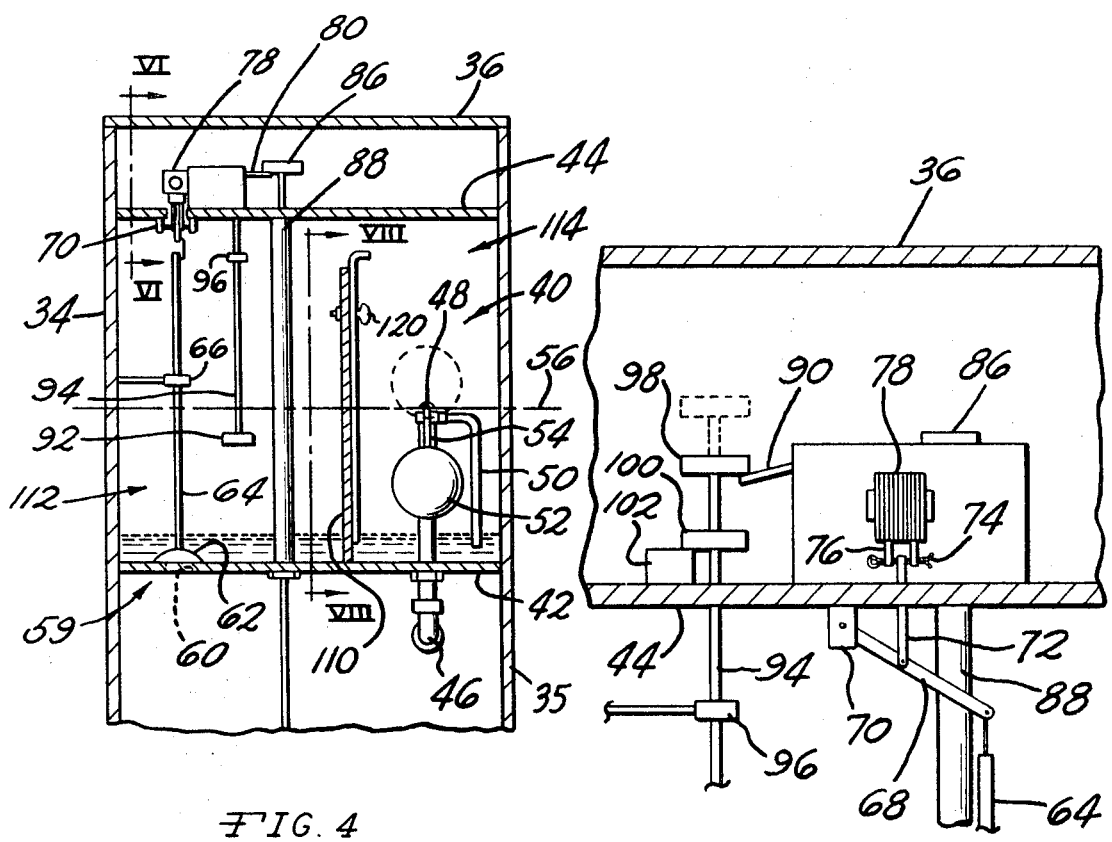
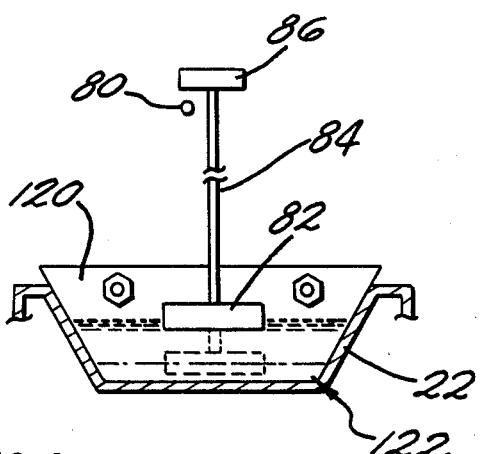
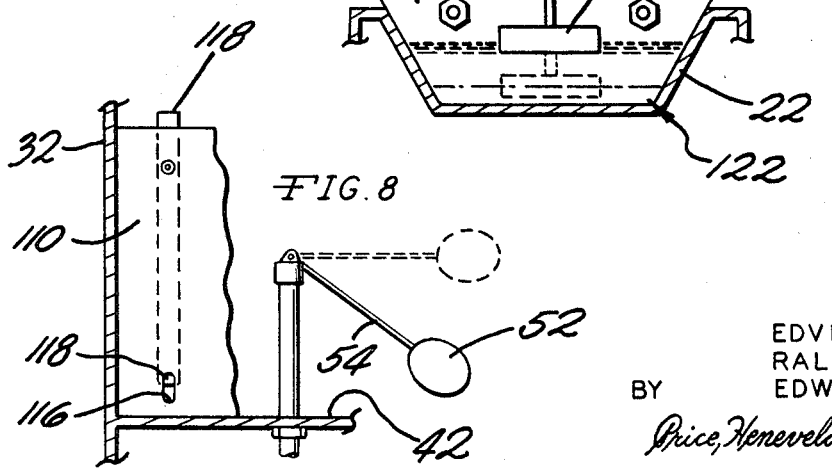

INVENTORS
EDVIN O. NEIMEYER
RALPH F. KOCH
EDWARD J. CRANE

BY Price, Heneveld, Huizenga & Cooper

ATTORNEYS

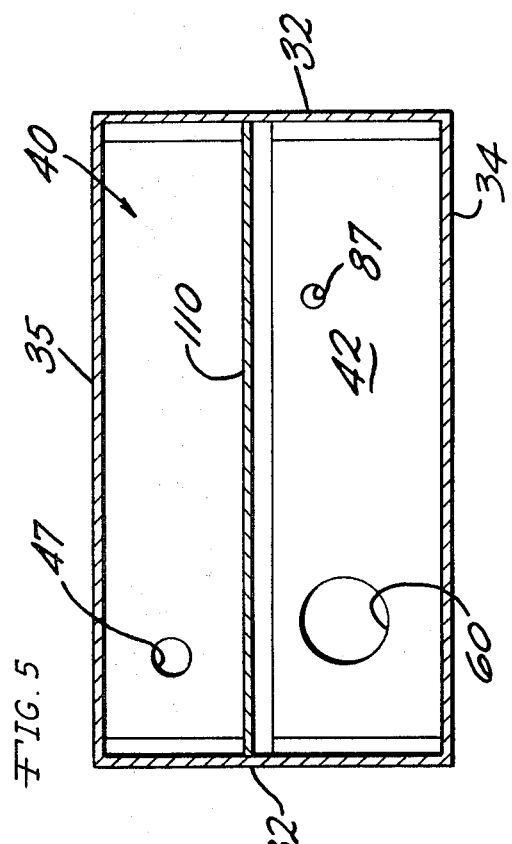
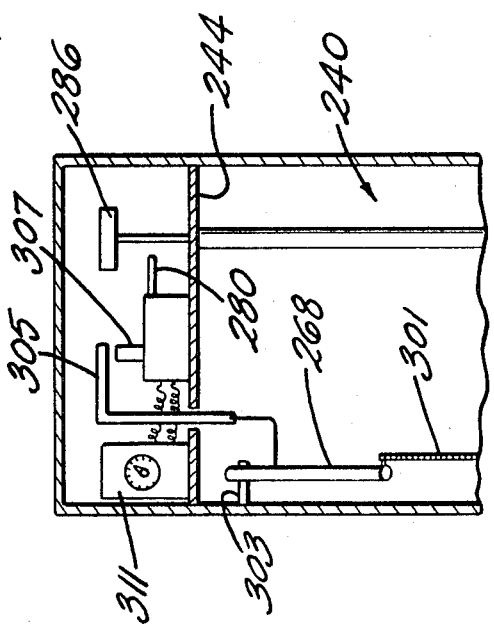
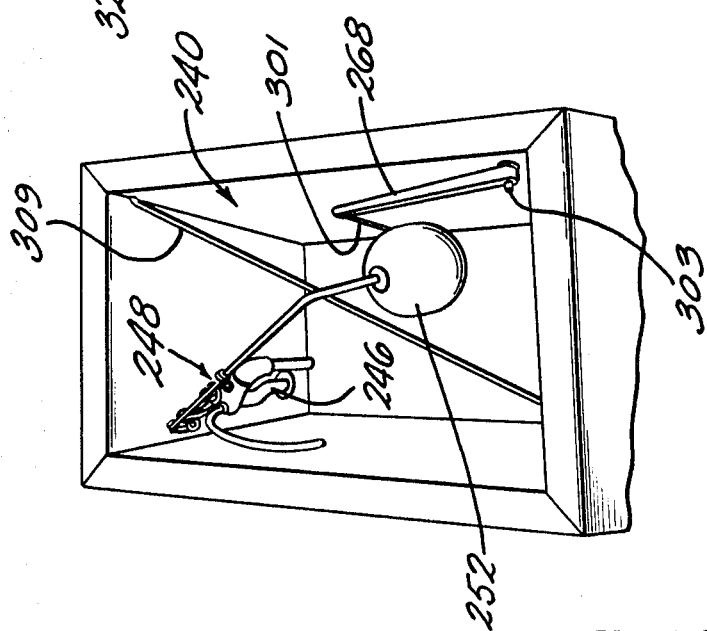

DEMAND LIQUID FEED STATION

BACKGROUND OF THE INVENTION

For years there has been a trend in animal husbandry toward automation wherein the care and feeding of the animals is done more and more by machine so as to release the farmer from these chores and also so as to enable a larger number of animals to be cared for. Where the animal is of the type that feeds on a mixture of water and dry feed, both the water and feed must of necessity be added together in the proper proportions. Earlier attempts to do this automatically have largely been time-actuated; that is, they have been initiated periodically according to the time of day regardless of the demands made by the animals. Examples of such systems are those disclosed in U.S. Pat. No. 609,728 issued to H. Bolinski U.S. Pat. No. 3,196,835 issued to B. Bergevin. Such a system experiences the disadvantage of having to be calibrated with the actual demands of the animals and periodically recalibrated, and in many cases the time actuation of the device results in feed sitting in the troughs uneaten and therefor wasted because of tending to become stale.

Although there have been some devices which did provide demand feeding, these devices usually have been quite complex and therefore expensive to manufacture. An example of such a device is disclosed in U.S. Pat. No. 3,204,821 wherein a double bucket is so designed as to be unstably mounted so that the addition of the water to one of the buckets causes it to rotate so as to empty. The addition of such a second bucket and the rotation of both add to the complexity of that device and therefore to the cost of its manufacture.

With regard to the elements utilized in the combination, many watering systems have been provided in the past, but they usually rely on electrical switches for opening and closing the flow of the water to the feeding trough, creating a source of expense and potential breakdown. An example of such a watering system is U.S. Pat. No. 2,701,548 issued to W. E. Wolfe. Still another water supply system is disclosed in U.S. Pat. No. 2,766,725 issued to A. H. Sievers, wherein the water level is maintained constant rather than maintained between two levels, the control being by a float operating a valve. When the water level in maintained constant, as soon as the level starts to drop the valve opens ever so slightly so as to let in just enough water to maintain the level. The result is a very slow flow of water out into the feeding trough. This arrangement has the disadvantage of not providing a vigorous flushing action of the type necessary to wash away any feed which might tend to block water passageways. Also, the seating of the control valve will eventually wear so that the position of the float has to be readjusted.

SUMMARY OF THE INVENTION

This invention relates to an animal feeding station of the "demand feeding" type which adds dry feed and water to a mixing and feeding trough only as it is used up by the animals. Specifically, the invention provides an improvement in an automatic animal liquid feeding station having a trough, means for automatically dropping a measured amount of feed into the trough, and means for automatically supplying a liquid to the trough; the improvement comprising a holding tank positioned between the liquid supplying means and the trough and permanently connected to the supplying means; liquid control means for first holding liquid in said tank and subsequently emptying substantially all of said liquid from the tank; means for sensing the depletion of the combined liquid and feed below a first level in said trough; and activating means responsive to said sensing means for automatically activating said control means and said dropping means; whereby the combined liquid and feed in said trough rises to said second level above said first level. The aforesaid activating means may include a first means for sensing the level of the liquid in the tank, the first liquid level sensing means being operatively connected to the dropping means to activate the same when the level sensed by the first liquid level sensing means drops below a prescribed position. An inlet valve to the tank is included as part of the supplying means and is responsive to its own liquid level sensing means in the tank. When the first liquid level sensing means is used, it and the inlet valve are separated within the tank by a partition which includes means for preventing liquid flow through the partition which includes means for preventing liquid flow through the partition above a prescribed rate but continually permitting flow below the rate. The dropping means includes means for adjustably altering the amount of feed dropped into any one position, such as hoods positioned to enclose openings in a channel, each hood including means for adjusting the positioning of it on the channel and means for partially closing the opening with which it cooperates.

Accordingly, it is an object of the invention to provide a device for demand feeding of animals so as to prevent undesirable exposure of unused food in the trough.

It is another object of the invention to provide a device of the above character which is easy to operate and adjust in the field and which is not likely to break down.

It is a related object of the invention to provide a device of the above character wherein there is a flushing of the water inlet to wash out any feed that might have clogged the inlet.

It is still another object of the invention to provide a device of the above character wherein the aforesaid flushing is accomplished with a simple construction which is inexpensively manufactured.

Still another object of the invention is to provide a device of the above character wherein the control of the aforesaid flushing of the water is accomplished by inexpensive means.

Still another related object is to provide a device of the above character wherein the amount of feed dropped into the trough can be altered, and the feed is dropped without being dispersed undesirably such as by the wind.

Other objects and advantages of the invention will become apparent upon reference to the following drawings and detailed discussion.

BRIEF DESCRIPTION OF THE DRAWINGS

FIG. 1 is an elevational view of a feeding station constructed in accordance with the invention;

FIG. 2 is a partial plan view of one end of the station illustrated in FIG. 1, taken generally along the line II–II OF FIG. 1;

FIG. 3 is an end elevational view partly in section of the station illustrated in FIG. 1;

FIG. 4 is a fragmentary sectional view taken along the line IV–IV of FIG. 3;

FIG. 5 is a sectional view taken along the line V–V of FIG. 3 illustrating the bottom wall of the tank with the parts contained therein removed;

FIG. 6 is a fragmentary sectional view taken along the line VI–VI of FIG. 4;

FIG. 7 is an enlarged fragmentary view, partially schematic and partly in section, similar to the view presented in FIG. 3 but illustrating the to position for the means sensing the depletion of the combined liquid and feed;

FIG. 8 is a fragmentary sectional view taken along the line VIII–VIII of FIG. 4;

FIG. 14 is a perspective view of some of the parts in an alternate embodiment of the controls for the supply of the liquid feed; and FIG. 15 is a fragmentary front elevation partly in section similar to FIG. 4 and illustrating the alternate embodiment presented in FIG. 14.

DESCRIPTION OF THE PREFERRED EMBODIMENTS

Figure 9:
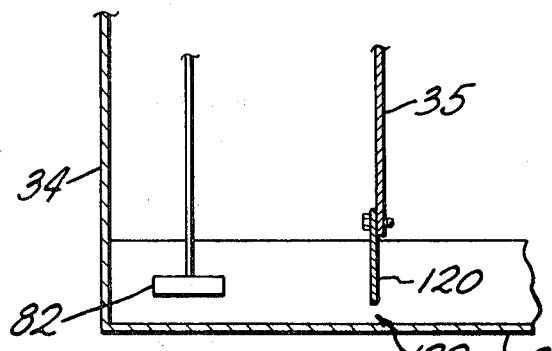
FIG. 9 is a fragmentary sectional view taken along the line IX–IX of FIG. 3.

The invention relates to an improved animal liquid feeding station wherein the liquid feed is supplied to the animals on demand. Specifically, the station comprises a frame 20 supporting a trough 22, a holding tank 40 at one end thereof, a feed hopper 134 adjacent to the tank at that end, an auger channel 130 spaced above the trough the entire length of the trough, a partitioning board 23 positioned above the auger channel, and a motor 138 mounted at the other end of the station. Partitions 24 are mounted between the auger channel and the trough 22 transversely across the trough so as to divide the station into a plurality of feeding stalls wherein each animal will not be disturbed by its neighbor. The partitioning board prevents animals from climbing from one side of the trough to the other, thus preventing disturbances.

With reference now to FIGS. 4—9, to mount the tank 40 on the frame 20, sidewalls 32, a backwall 34, and a front wall 35 extend upwardly from one end of the frame and are closed off at the top by a top plate 36. Contained within and formed by these walls is the tank 40 (FIG. 4) having a bottom plate 42 and a top plate 44. To supply liquid to the tank 40, a liquid supply line 46 passes through one of the sidewalls 32 and into the space below the tank 40 and up through an opening 47 in the bottom plate 42. To selectively control the flow of the liquid out of the inlet 46 and into the tank, an inlet ball valve 48 is positioned at the top end of the inlet 46, a pipe 50 extending from the ball valve down into the tank. To sense the level of the liquid in the tank, a float 52 is provided. To activate the ball valve in response to the liquid level as sensed by the float 52, the float is mounted on a rod 54 which pivotally attaches to the ball valve in a conventional manner similar to toilet flush tanks. The liquid inlet thus functions in the following manner. With the float 52 in the position shown in FIG. 4, the valve 48 is open and the liquid comes into the tank through the inlet 46 and the pipe 50. As the water level rises, the float 52 rises until it reaches the position shown in dashed lines, thereby closing off the inlet valve 48. At that time, the water occupies the line indicated by the dashed line 56.

To empty the tank, the tank has an outlet valve 59 which comprises an opening 60 in the bottom plate 42 and a float cover 62 which normally firs over the opening. The float cover is mounted on a rod 64 which is guided for vertical movement by a bushing 66 mounted on the backwall 34. The other end of the rod 64 is hooked to a lever 68 pivotally mounted on a bracket 70 depending from the top plate 44. The lever is connected by a pin 72 and a cotter pin 74 to downwardly depending lugs 76 on a solenoid 78 (FIG. 6). To activate the solenoid so as to pull the lugs 76 up thereby rotating the lever 68 upwardly so as to pull the float cover 62 off the valve 59, a limit switch 80 is mounted on top of the top plate 44, operatively connected to the solenoid. The limit switch 80 is responsive to a float 82 positioned in the trough 22 (FIG. 7) immediately below valve 59, the float being mounted on a rod 84 which has at its opposite end a shoulder 86 which engages the limit switch 80. To guide the rod in its vertical movement through a hole 87 in the tank, a pipe 88 is mounted vertically between the top plate 44 and the bottom plate 42, a conventional washer being utilized to seal the pipe against any leakage through the hole 87 in the bottom plate 42. It will be thus apparent that the float 82 operates in the following fashion: in FIG. 3 the float is shown in the liquid-depleted position wherein the shoulder 86 has just depressed the limit switch 80 so that the next step will be the solenoid pulling the lever arm 68 upward thereby emptying the tank 40. As the liquid exits through the opening 60 in the bottom plate 42, the liquid in the trough 22 rises so that the float moves from the position shown in dotted lines in FIG. 7 up to the position shown in full lines. In the latter position, the shoulder 86 rises from the limit switch 80 which deactivates the solenoid 78, thereby readying the solenoid to repeat the process when the limit switch is again triggered. It will be seen that the float cover 62, by nature of its light density elastic polymeric material, floats in the liquid, thereby allowing substantially all the tank to be emptied. The valve 59 closes only when the liquid in the tank drops to such a low level that the floating cover 62 drops onto the valve.

To activate the auger channel so as to drop feed onto the trough, a second limit switch 90 is mounted also above the top plate 44. The limit switch 90 is responsive to a second float 92 mounted on the end of a rod 94, which rod is guided by a bushing 96 mounted on one of the sidewalls. The opposite end of the rod 94 has thereon a shoulder 98 which contacts the limit switch 90 when the float 92 drops. To prevent the float 92 from dropping so low as to undesirably load the limit switch 90, a shoulder 100 is adjustably fixed to the rod 94 adjacent to the shoulder 98 so as to bear upon a block 102. It will be seen that the operation of the float 92 is as follows. When the level of the liquid in the tank 40 drops below the line 56, the float 92 drops until the shoulder 98 triggers the limit switch 90 so as to initiate the dropping of the feed from the auger channel in a manner hereinafter discussed. As the liquid rises within the tank 40, the float 92 will rise until it reaches the position indicated by line 56. As the shoulder 98 releases the limit switch 90, the activation of the dropping means for the feed is terminated.

To meter the length of time that the dropping means is activated by the float 92, means are provided including a partition 110 for controlling the rate of liquid rise in the side 112 of the tank 40 wherein the float 92 is located. To prevent liquid flow from the inlet side 114 of the tank 40 to the side 112 wherein is located the float 92 from exceeding a prescribed rate while at the same time allowing continual flow blow that rate, a slot 116 is provided in the partition 110 near the bottom of the same (FIG. 8). To allow the opening provided by the slot 116 to be adjusted, a slide 118 is mounted on the partition 110 by a setscrew 120, the slot 116. Thus, the rate of flow through the slot 116 is dependent upon the height of the liquid level line 56 prior to the raising of the float cover 62 from the valve 59, as well as upon the size of the slot 116 opened to the flow by the slide 118. It will be readily apparent that the slower the flow through the opening formed by the slot 116 and the slide 118, the longer the dropping means will be activated and the more feed will be dropped into the trough.

To keep the vicinity of the float 82 relatively free of solid feed and yet at the same time allow the liquid dropped from the tank 40 through the valve 59 to move into the feeding areas of the trough, a divider 120 shaped to fit the sides of the trough (FIG. 7) is bolted to the front wall 35 in adjustable manner, so as to leave a gap 122 (FIG. 9). The liquid level in the vicinity of the float 82 will thus be the same as the level of he liquid and feed in the remainder of the trough. To prevent the liquid falling form the tank 40 and splashing out of the trough, splash plates 124 are bolted to the side walls 32.

Figure 10:
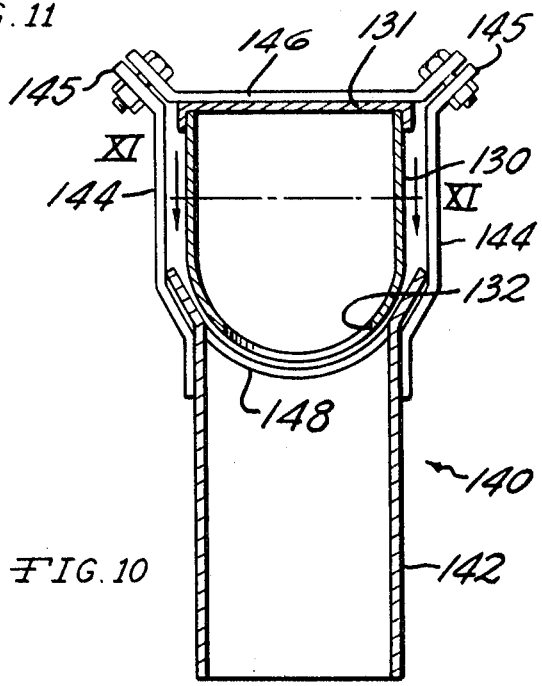
FIG. 10 is a sectional view taken along the line X–X of FIG. 1.

Turning now to FIGS. 1—2, and 10—13, to distribute feed at various positions within the trough, 22 throughout the length of the trough, a channel 130 is attached to the front wall 35 and is spaced above the entire length of the trough by the partitions 24. To allow the feed to drop out of the channel 130, openings 132 are formed at various intervals, the figures illustrating five such openings, for the entire length of the trough. To cover the channel, a top plate 131 is provided (FIG. 10). To maintain a supply of feed to be distributed through the channel 130, a hopper 134 is also attached to the front wall 35, the hopper partially straddling one end of the exposed trough (FIG. 2). The hopper tapers to the bottom where it is open to expose an auger 136 which distributes the feed through the channel. To drive the auger, a motor 138 surrounded by a guard 139 is mounted at the end of the frame 20 opposite to the tank 40, the motor being activated by limit switch 90 in the sequence described above.

Figure 12:
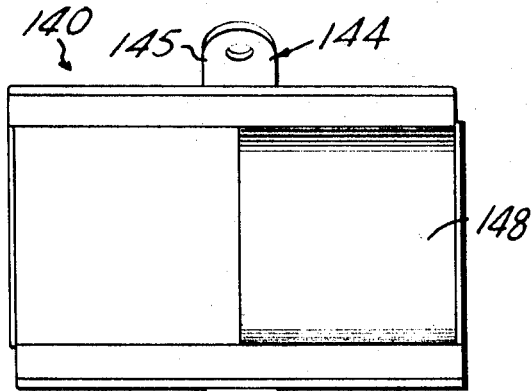
FIG. 12 is a plan view of the hood illustrated in FIG. 11, the channel and the top strap having been omitted.
Figure 11:
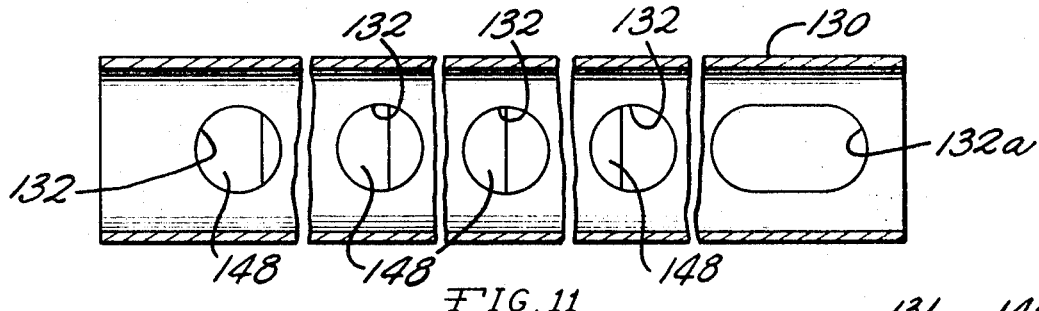
FIG. 11 is a fragmentary sectional view taken along the line XI–XI of FIG. 10 and showing only the auger channel and the leading edges of the baffles.
Figure 13:
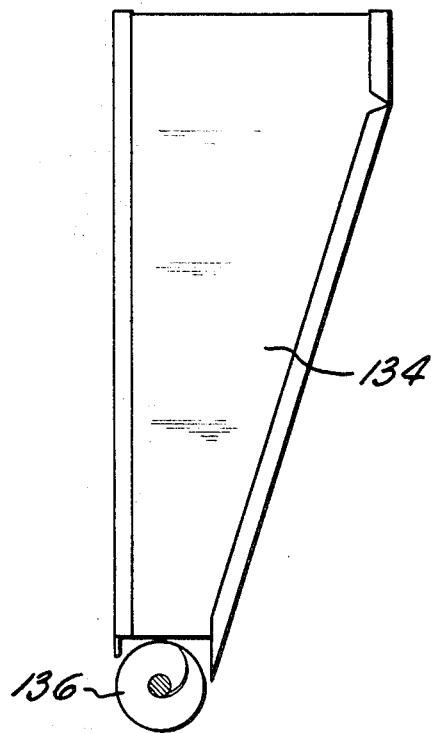
FIG. 13 is a sectional view taken along the line XIII–XIII of FIG. 2 and illustrating only the hopper and the auger.

Because an auger will drop everything which it is pushing at the first opening it encounters, adjustable means are provided for controlling the size of the openings 132. These means include, for each opening, a hood 140 (FIG. 12). To insure that the wind will not undesirably disperse feed dropping out of the openings in the channel, the hood includes a downwardly depending body 142 positioned to enclose the opening with which it cooperates (FIG. 10). To slidably attach the hood to the channel so that it can be adjusted along the length of the channel, the body has welded to it on each of its sides a lug 144, the lug being provided with ears 145 and drilled so that it can be bolted to a top strap 146 which passes over the top plate 131 of the channel. The body 142 has a baffle plate 148 curved to fit the curve of the channel and extending horizontally only halfway over the top of the hood, so that the baffle can be utilized to partly or completely block the opening 132 in the channel. The exact amount of the blockage obtained by the baffle 148 is determined by the position of the hood with respect to the opening. FIG. 11 illustrates a variety of positions. However, with respect to the hood positioned over the opening 132a in the channel which is the farthest removed from the tank 40, the hood being identified as 140a, that hood is so positioned that the baffle 148 does not interfere with the opening. To insure that all the feed delivered to the last part of the channel will drop out the last opening 132a and to allow easy access to the channel in case of blockage, that last opening is double-sized (FIG. 11).

The electrical wiring for the station will be readily apparent to one skilled in the art, the only requirement being that the solenoid 78 and its switch 90. A conventional 115 v. source of electricity operates the electrical components.

OPERATION

In summary, the embodiment illustrated in FIGS. 1—13 operates as follows. When the sensing float 82 drops down to the position shown in FIG. 3 which is the dotted position shown in FIG. 7, the shoulder 86 triggers the limit switch 80 wherein the solenoid causes the lever arm 68 to pull the float cover 62 off the opening 60. At this point, the tank 40 which contains liquid at the level of line 56 quickly empties out of valve 59 in a flushing action, the emptying liquid quickly moving into the trough through the gap 122 also in a flushing action. When the tank 40 is substantially emptied, the float cover 62 is drawn back into position by the low level of the liquid and by the fact that the float 82 is raised by the increased liquid in the trough so as to release the limit switch 80. As the liquid in the tank is emptying out opening 60, the float 92 and the float 52 drop, thereby actuating the motor in the auger by means of the shoulder 98 contacting the limit switch 90, and actuating the inlet valve 48 so as to begin the refilling of the tank 40, respectively. The motor 138 causes the auger 136 to rotate, thereby pulling feed from the hopper into the channel 130 and down through the openings 132 and 132a into the trough. The auger motor continues to operate until the float 92 releases the limit switch 90 as the float 92 rides up on the liquid refilling the tank. The size of the slot 116 as controlled by the slide 118 determines the rate at which the side 112 of the tank refills. The refilling of the tank terminates when the float 52 reaches the dotted position shown in FIGS. 4 and 8, which position is obtained when the liquid reaches the level of line 56.

It will be readily apparent that a wide variety of liquid and feed combinations can be utilized, the most common liquid being of course water. Because the emptying means for the tank and the dropping means for the feed are activated based upon a mechanical sensing through a float of the level of the combined liquid and feed in the trough, there are no expensive electrical sensing devices to install and maintain.

ALTERNATE EMBODIMENT

FIGS. 14 and 15 illustrate an alternative embodiment for the construction of the invention, particularly in the control of the tank emptying means and the feed dropping means. The parts in the alternative embodiment which correspond to those previously described have the same reference numerals to which the distinguishing number "200" has been added. Thus, in FIG. 14, the liquid tank 240 has no partition therein, and has only one float 252 which controls an inlet valve 248 on an inlet pipe 246. A float cover and an outlet valve similar to the previous embodiment are utilized, the cover being raised by the pivoting of a lever arm 268 which has at one end a chain 301 connected to the float cover. cover. The other end of the arm 268 is pivoted to the wall at 303. To cause the pivoting of the lever 268, an angle bar 305 is hooked to the lever and passes through the top plate 244 upwardly to where it is engaged from beneath by a solenoid 307. The solenoid 307 is actuated by a limit switch 280 in a fashion similar to the description of the previous embodiment. As a further refinement, an electric heating element 309 can project into the tank.

The operation of the alternative embodiment shown in FIGS. 14 and 15 is as follows. When the shoulder 286 drops into contact with the limit switch 280 due to the lack of liquid in the trough, the solenoid 307 operates to raise the bar 305, thereby causing the lever arm 286 to pull up the float cover so as to empty the tank. The switch 280 also serves to close electrical contact with the motor driving the auger, so as to initiate the dropping of feed into the trough. Because there is no additional float in the tank, the length of time the auger operates is determined by a conventional electric timer 311 which can be set for any desired time. As the water rushes out of the tank 240 into the trough, the float 252 drops, thereby opening valve 248. When the tank is substantially empty, the float cover drops over the valve as in the previous embodiment, thereby allowing the water coming into the tank to refill the tank until the float 252 occupies the full level at which time the valve 248 is closed. The timer 311 terminates the auger motor based on the desired time setting.

The embodiments of the invention in which we claim an exclusive property or privilege are defined as follows.

1. In an automatic animal liquid feeding station having a trough, means for automatically dropping a measured amount of feed into said trough, and means for automatically supplying a liquid to said trough, the improvement comprising: a holding tank positioned between said liquid supplying means and said trough and permanently connected to said supplying means; liquid control means for first holding liquid in said tank and subsequently emptying substantially all of said liquid from said tank; means for sensing the depletion of the combined liquid and feed below a first level in said trough; and activating means responsive to said sensing means for automatically activating said control means and said dropping means; whereby the combined liquid and feed in said trough rises to a second level above said first level.

2. The improved animal liquid feeding station as defined in claim 1, wherein said activating means includes first means for sensing the level of the liquid in said tank, said first liquid level sensing means being operatively connected to said dropping means to activate the same when said level drops below a first prescribed position.

3. The improved animal liquid feeding station as defined in claim 2 wherein said tank includes means for metering the length of time said dropping means is activated by said first liquid level sensing means.

4. The improved animal liquid feeding station as defined in claim 3 wherein said metering means includes a partition dividing it into two zones; said tank includes second means for sensing the level of the liquid in said tank and an outlet valve; and said supplying means includes an inlet valve for said tank; said partition separating said first liquid level sensing means and said outlet valve from said second liquid level sensing means and said inlet valve.

5. The improved animal liquid feeding station as defined in claim 4, wherein said partition includes means for preventing liquid flow through said partition above a prescribed rate but continually permitting flow below said rate, said rate being dependent upon the height of said liquid in said tank prior to said activation of said emptying means.

6. The improved animal liquid feeding station as defined in claim 5 wherein said preventing means is a hole.

7. The improved animal liquid feeding station as defined in claim 5 wherein said supplying means includes means for actuating said inlet valve which means is responsive to said second liquid level sensing means.

8. The improved animal liquid feeding station as defined in claim 5 wherein said trough level sensing means penetrates below said second level before said emptying means is actuated.

9. The improved animal liquid feeding station as defined in claim 5 wherein said outlet valve includes a float cover and a valve seat, said cover being floatable so as to remain lifted from said seat until substantially all the liquid is drained from said tank.

10. The improved animal liquid feeding station as defined in claim 1 wherein said tank includes means for sensing the level of liquid in said tank, and said supplying means includes an inlet valve and means responsive to said tank liquid level sensing means for actuating said inlet valve.

11. The improved animal liquid feeding station as defined in claim 1 wherein said trough level sensing means penetrates below said second level before said emptying means is actuated.

12. The improved animal liquid feeding station as defined in claim 1 wherein said tank includes an outlet valve having a float cover which is floatable so as to remain lifted from said tank.

13. The improved animal liquid feeding station as defined in claim 1 wherein said dropping means includes means for adjustably altering the amount of feed dropped into any one position in said trough.

14. The improved animal liquid feeding station as defined in claim 13 wherein said altering means includes a hood having a downwardly depending body spaced above the trough.

15. The improved animal liquid feeding station as defined in claim 14 wherein said hood includes a baffle plate extending horizontally only part way across the top of said hood.

16. The improved animal liquid feeding station as defined in claim 15 wherein said dropping means includes a channel having spaced openings therein, and wherein said hood is positioned enclosing one of said openings with said baffle plate extending at most only partially across said opening.

17. The improved animal liquid feeding station as defined in claim 16 wherein the one of said hoods positioned farthest from said tank has its baffle plate located in a noninterfering position with respect to the channel opening with which said farthest hood cooperates.

18. The improved animal liquid feeding station as defined in claim 1 wherein said tank includes means for metering the length of time said dropping means is activated.

19. The improved animal liquid feeding station as defined in claim 18 wherein said tank includes means for sensing the level of liquid in said tank and said supplying means includes an inlet valve and means responsive to said liquid level sensing means for actuating said inlet valve.

20. The improved animal liquid feeding station as defined in claim 18 wherein said metering means includes an electric timer operatively connected to said dropping means to deactivate the same.

21. The improved animal liquid feeding station as defined in claim 20 and further including a heating element positioned within said tank.

PO-1050
(5/69)

UNITED STATES PATENT OFFICE
CERTIFICATE OF CORRECTION

Patent No. 3,585,969          Dated June 22, 1971

Inventor(s) Edward J. Crane, Ralph F. Koch, Edvin O. Neimeyer

It is certified that error appears in the above-identified patent and that said Letters Patent are hereby corrected as shown below:

Column 2, line 61;
    "to" should be --- other ---;

Column 4, line 42;
    Before "slot 116." insert --- slide 118 extending downwardly so as to cover all or a part of the ---;

Column 5, line 34;
    After "switch" insert --- 80 be wired in parallel with the motor 138 and its switch ---;

Column 7, line 33;
    After "said" insert --- seat until substantially all the liquid is drained from said ---.

Signed and sealed this 21st day of March 1972.

(SEAL)
Attest:

EDWARD M. FLETCHER, JR.
Attesting Officer

ROBERT GOTTSCHALK
Commissioner of Patents